United States Patent [19]
Galba et al.

[11] Patent Number: 5,450,893
[45] Date of Patent: Sep. 19, 1995

[54] HUMIDISTAT AND INTERFACE

[75] Inventors: Mark A. Galba, Lyons; Gus N. Gallas, Hickory Hills, both of Ill.

[73] Assignee: Galmar Enterprises, Inc., Bridgeview, Ill.

[21] Appl. No.: 166,259

[22] Filed: Dec. 13, 1993

[51] Int. Cl.⁶ ............................................. F24F 3/14
[52] U.S. Cl. ................... 165/21; 62/176.6; 236/44 A; 236/44 C
[58] Field of Search ................. 165/14, 21; 62/176.1, 62/176.5, 176.6; 236/44 A, 44 C, 44 R

[56] References Cited

U.S. PATENT DOCUMENTS

| | | | |
|---|---|---|---|
| 3,989,097 | 11/1976 | Schildknecht | 165/21 |
| 4,424,933 | 1/1984 | Sutoh | 236/44 A |
| 4,582,123 | 4/1986 | Williams | 165/21 |
| 4,659,009 | 4/1987 | Newell | 236/44 C |
| 4,813,475 | 3/1989 | Couvrette | 165/21 |
| 4,819,716 | 4/1989 | Beachboard | 165/21 |
| 4,852,363 | 8/1989 | Kampf | 62/176.6 |
| 4,974,665 | 12/1990 | Zillner | 165/21 |
| 5,181,552 | 1/1993 | Eiermann | 62/176.6 |
| 5,346,128 | 9/1994 | Wacker | 236/44 A |
| 5,353,862 | 10/1994 | Akiyama | 165/21 |

Primary Examiner—Ira S. Lazarus
Assistant Examiner—Daniel J. O'Connor
Attorney, Agent, or Firm—Lee, Mann, Smith, McWilliams, Sweeney & Ohlson

[57] ABSTRACT

The present invention provides for a humidistat which can be connected to a humidifier through a thermostat and its existing wiring. The thermostat has a plurality of output leads for a heating signal, a fan signal and/or a cooling signal. The humidistat includes a first input for receiving the heating signal from the thermostat, a sensor associated with the first input for sensing the relative humidity of the air in the enclosed volume, a second input for receiving the cooling signal from the thermostat, and a first switch with a heating position and a cooling position for switching between the first and second inputs, respectively, and an interface module for selectively energizing either a humidifier when the first switch is in the heating position or a cooling system when the first switch is in the cooling position. The interface module can further include a second switch for switching between the humidification position and the cooling position and a timing device for timing a predetermined period of time after receiving the cooling signal to delay switching the second switch to the cooling position.

11 Claims, 3 Drawing Sheets

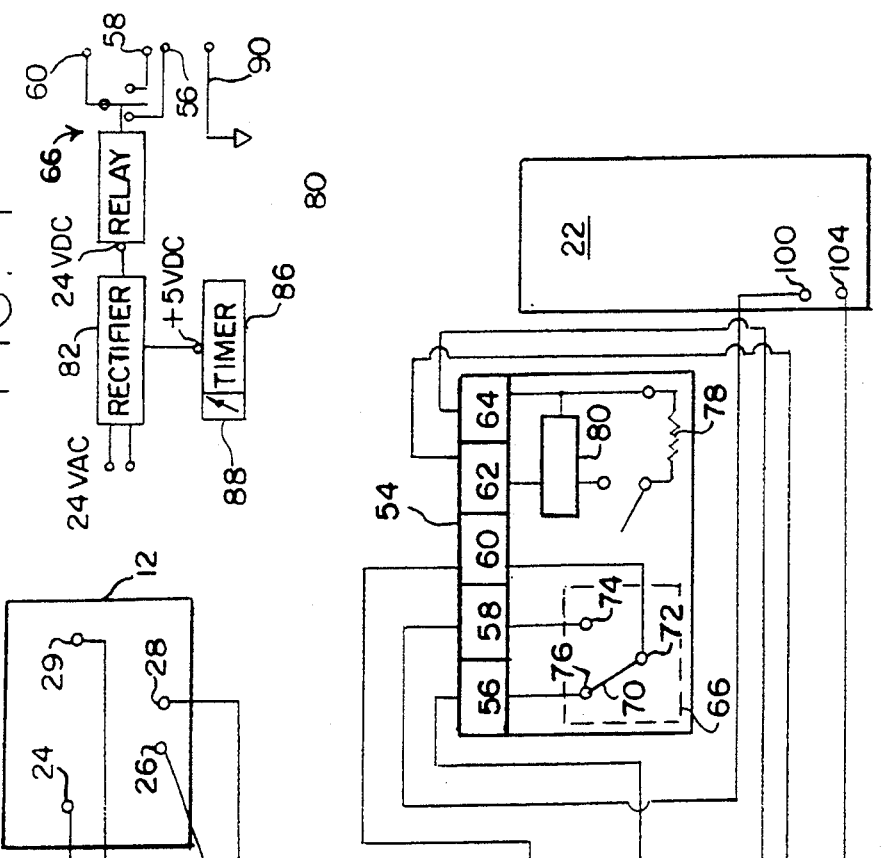
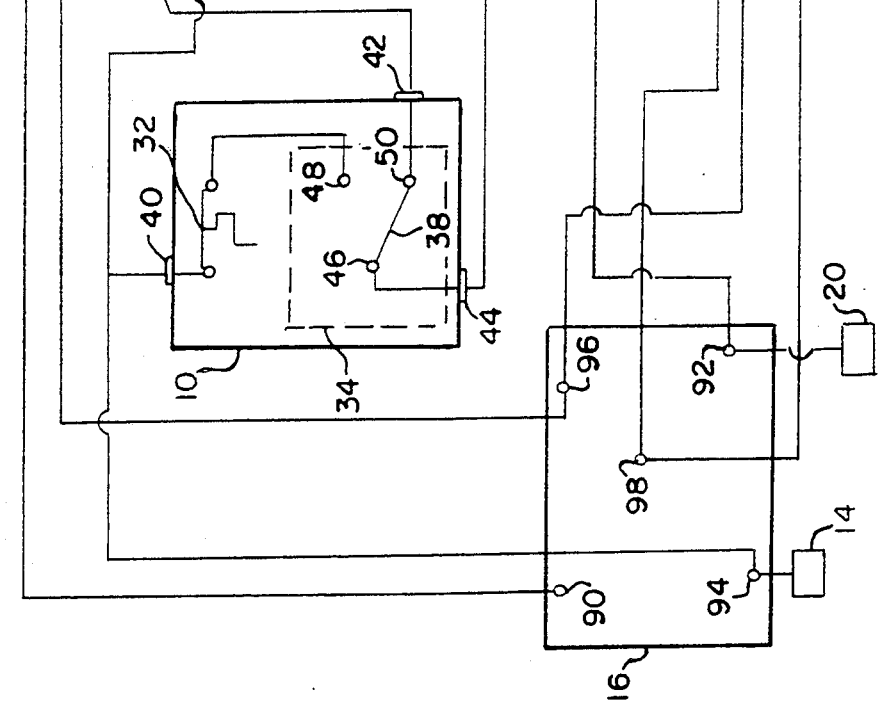

HUMIDISTAT AND INTERFACE

BACKGROUND OF THE INVENTION

1. Field of the Invention

The present invention relates to a humidistat and more particularly to a humidistat having an interface module for use in conjunction with an existing thermostat.

2. Description of the Prior Art

Various thermostats and humidistats for controlling the temperature and humidity levels in an enclosed area have been developed., In a building or other structure with an installation of a thermostat connected to a heating and cooling system, the addition of a humidifier and a humidistat to moisturize the air in the enclosed volume presents particular problems and disadvantages. Typically, the thermostat is placed in a central location within the building and is electrically connected to the heating and cooling system at another location. As such, these existing installations do not provide for the easy addition of the humidifier because new wiring is needed and must be passed through the walls of the structure so as to connect the humidistat to the humidifier and the humidifier to the heating system. The humidistat, like the thermostat, also should be located centrally within the enclosed volume and adjacent the thermostat. The installation of additional wires often requires opening a hole in the wall, drilling holes between floors, rebuilding the wall and other laborious tasks. These problems increase the time and overall cost of the installation. Thus, a need exists for a humidistat having an easy installation procedure that overcomes the disadvantages of the known humidistats.

SUMMARY OF THE INVENTION

The present invention provides for a humidistat for sensing the humidity of air in an enclosed volume and sending a humidity signal to a humidifier when the humidity falls below a preselected value. The humidistat is specially adapted for use with a thermostat having a plurality of output leads for a heating signal, a fan signal and a cooling signal. The humidistat has a first input for receiving the heating signal from the thermostat. A second input of the humidistat receives the cooling signal from the thermostat. The humidistat has a first switch with a heating position and a cooling position for switching between the first and second inputs, respectively, wherein the first switch supplies the cooling signal at an output of the humidistat when in the cooling position. A sensor is connected between the first input and the heating position to sense the humidity of the air in the enclosed volume wherein the first switch supplies a humidity increase signal at the output of the humidistat when the switch is in the heating position and the sensor calls for increased humidity. An interface module is provided for selectively energizing either a humidifier when the first switch is in the heating position or a cooling system when the first switch is in the cooling position. The interface module includes a second switch for switching between the humidifier and the cooling system. The interface module can include a relay for switching the second switch between a first position to energize the humidifier and a second position to energize the cooling system and the relay is energized when the fan signal is applied to the interface module. Alternatively, the interface module can include a timing device to delay switching the second switch to the second position for a predetermined period of time after receiving the fan signal. The timing device includes a relay and a timer, whereby when the timer signals the expiration of the predetermined period of time, the relay is energized to close the second switch to the second position thereby energizing the cooling system. The humidistat of the present invention can be electrically connected to the humidifier through the existing wiring between the thermostat and the heating and cooling systems, thereby eliminating the need for the additional excess wiring and installation procedures and expense normally associated with the installation of a humidifier.

BRIEF DESCRIPTION OF THE DRAWINGS

These and other objects and advantages of the present invention will become readily apparent upon consideration of the following detailed description and attached drawings, wherein:

FIG. 3 is a circuit diagram illustrating the operation of the humidistat and interface of the present invention in the summer or cooling mode; and FIG. 4 is a schematic diagram illustrating the timing circuit of the present invention.

DETAILED DESCRIPTION OF THE PREFERRED EMBODIMENT

Figure 1:
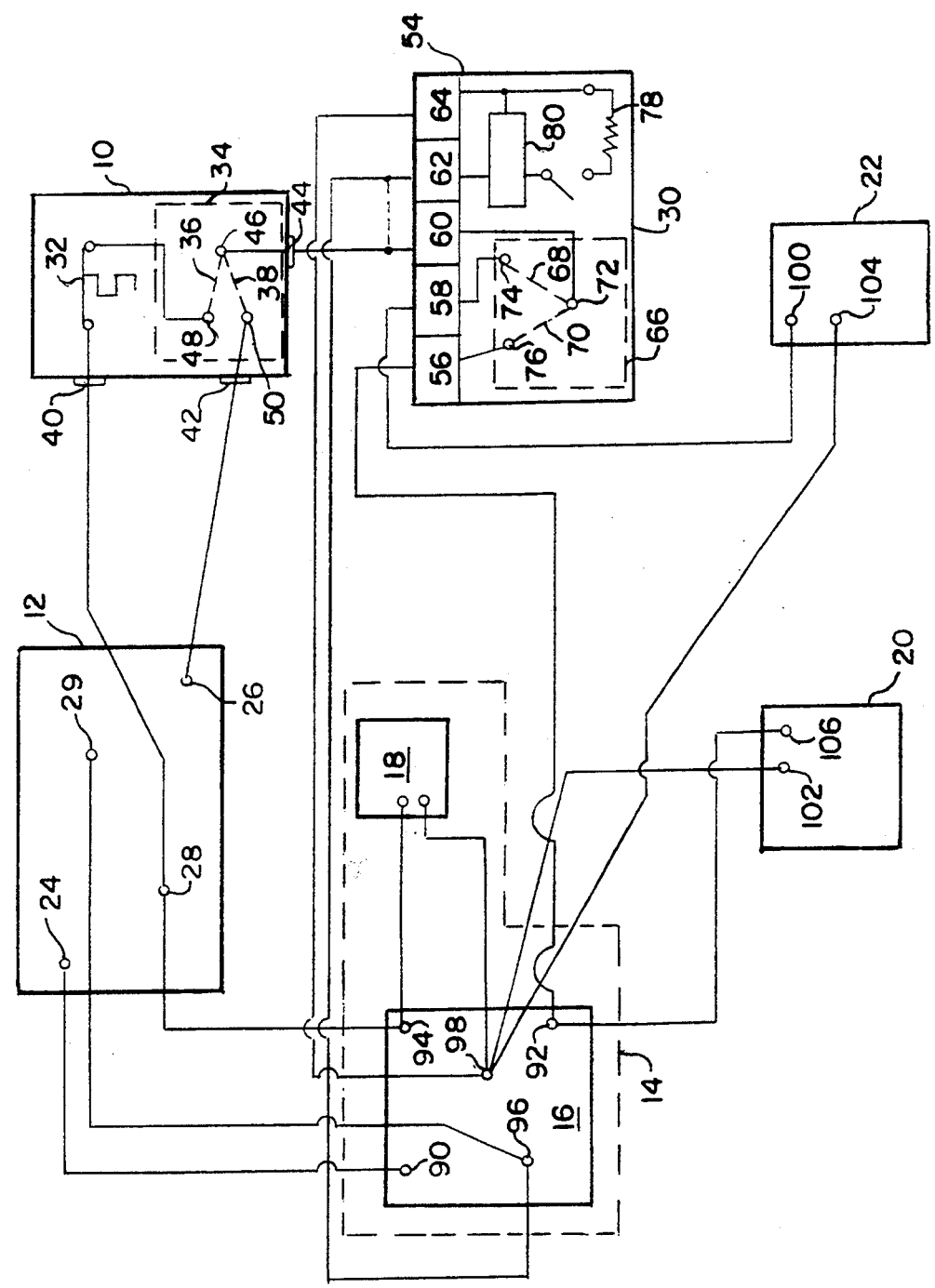
FIG. 1 is a schematic diagram illustrating the humidistat and interface of the present invention electrically connected to an existing thermostat associated with a heating and cooling system and a humidifier.

FIGS. 1-4 illustrate the humidistat 10 of the present invention for use with an existing thermostat 12. The present invention will be described using a thermostat 12 which controls a heating system 14 that includes a relay center 16 and an electrically energizable gas valve 18. The heating system 14 is described generally because, while other elements of a heating system exist such as a furnace and blower (not shown), the present invention principally uses existing connections of the heating system 14 such as a terminal strip (relay center) having a connection for the gas valve 18. Additionally, the thermostat 12 can control a cooling system 20 such as an air conditioning unit having a compressor and fan. The present invention will be described when the humidistat 10 and a humidifier 22 are connected to the thermostat. 12 for controlling an existing heating system 14 and cooling system 20 in a building or other structure.

Figure 2:
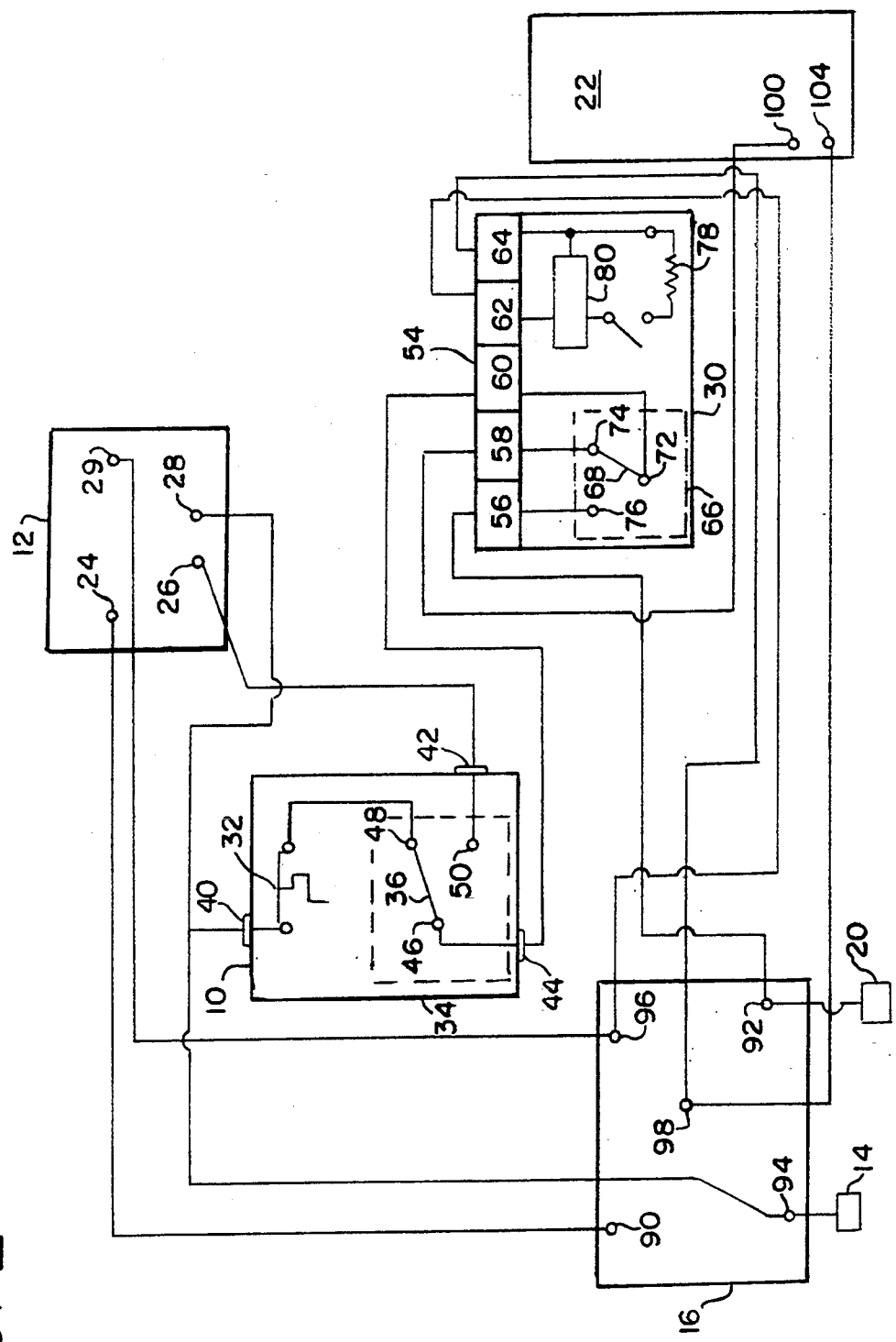
FIG. 2 is a circuit diagram illustrating the operation of the humidistat and interface of the present invention in the winter or humidification or heating mode.

Referring to FIG. 1, the thermostat 12 controls the operation or energization of the heating system 14 and cooling system 20. The thermostat 12 can be a known three-lead or four-lead thermostat having input and output leads to control the heating system 14 and cooling system 20. Typically, a three-lead thermostat includes an input lead for power and output leads for a heating signal and a fan signal whereas a four-lead thermostat includes an additional output lead for a cooling signal. In FIGS. 1-3, a four-lead thermostat 12 is utilized to illustrate the operation of the present invention. The thermostat 12 has a power lead 24, a cooling lead 26, a heating lead 28 and a fan lead 29. The thermostat 12 is placed in a central location in the building with wires connecting leads 24, 26, 28 and 29 to the heating and cooling systems which are at a separate location.

A preferred embodiment of the present invention provides for the humidistat 10 to be connected to the existing thermostat 12. The humidistat 10 and thermostat 12 are energized by an appropriate connection to the power lead 24. An interface module 30 forms a part of the system to utilize existing wiring that transmit the cooling and fan signals from the cooling lead 26 and fan lead 29 so as to operate the humidifier 22 without installing additional wiring directly between the humidistat 10 and humidifier 22. The purpose of the present invention is to utilize an existing wire to energize either the cooling system 20 or humidifier 22. This is advantageous because the humidistat 10 can be located adjacent the existing thermostat 12 and can utilize existing wiring throughout the building without having to run new wiring from the humidistat 10 to the humidifier 22.

The humidistat 10 includes a humidity sensor 32, a summer/winter switch 34 having a heating (winter) position 36, shown in FIG. 2 and cooling (summer) position 38, as shown in FIG. 3, inputs 40 and 42, and an output 44. The inputs 40 and 42 receive the heating and cooling signals, respectively, from the thermostat 12. The humidity sensor 32 is connected between the input 40 and the summer/winter switch 34. The humidistat 10 further includes an output 44 so as to supply either a humidity signal from the humidity sensor 32 to increase the humidity in the enclosed volume or a cooling signal from input 42 depending on the position of the summer/winter switch 34.

The humidistat 10 is connected to the thermostat 12 by making a connection from the heating lead 28 to the input 40. The existing wire connected to the cooling lead 26 providing the cooling signal is split using one end to connect to the input 42 and the other end to the output 44, thereafter the wire continues through the walls or the like to the separate location for the heating system 14 and cooling system 20. Thus, the humidistat 10 of the present invention advantageously uses a single wire to signal for an increase in the cooling or in the moisturizing of the air in the enclosed volume so as to eliminate installation problems of the prior art.

The summer/winter switch 34 can be a single pole double throw switch having pole 46 and contacts 48 and 50. As illustrated in FIG. 2, when the summer/winter switch 34 is in the heating (winter) position 36, the contact between pole 46 and contact 48 is closed. Thus, when humidity sensor 32 of the humidistat 10 closes to generate a call for an increase in moisture, the heating signal at input 40 is modified and used as a humidity signal. The humidity signal is generated at output 44 and supplied to the interface module 30. As illustrated in FIG. 3, when the summer/winter switch 34 is in the cooling (summer) position 38, the contact between pole 46 and contact 50 is closed. Thus, when the thermostat 12 generates a call for cooling or otherwise for an decrease in temperature, the cooling signal at input 42 is also generated at output 44 and supplied to the interface module 30.

The interface module 30 includes a terminal strip 54 having contacts 56, 58, 60, 62 and 64. The terminal strip 54 allows for making connections for input and output signals at the interface module 30. The interface module 30 further includes a switch 66 having a first position 68 to effectuate humidification, shown in FIG. 2, and a second position 70 to effectuate cooling, as shown in FIG. 3. The switch 66 can be a single pole double throw switch having a pole 72, a contact 74 and a contact 76. The interface module 30 includes an electrically energizable relay 78 operative to throw or close switch 66 to the second position 70 from the first position 68. In operation, when the fan signal is applied at relay center 16, 24 VAC is generated and applied by a connection to contact 62 of the interface module 30. This energizes relay 78 to close and throw switch 66 to the second position 70, allowing for energization of the cooling system 20. Additionally, interface module 30 can include a timing delay circuit 80 as illustrated in FIG. 4 so as to delay the energization of the cooling system 20 for a predetermined period of time, for example, to delay the energization of the compressor of the cooling system 20 for 30 seconds.

As illustrated in FIG. 4, the timing delay circuit 80 includes a rectifier 82, a relay 84 and a timer 86 to control the energization of the cooling system 20. Typically, known heating and cooling systems 14 and 20, respectively, are energized using 24 VAC. When the fan signal is applied at relay center 16, 24 VAC is generated and applied to contact 62 of the interface module 30. The 24 VAC is first applied to the rectifier 132 to generate direct current output voltages of +24 VDC to energize one side or leg of the relay 84 and +5 VDC to energize the timer 86. Once energized, the timer 86 begins a timing cycle 88 adjustable to time a predetermined period of time. The timing cycle 88 can be adjusted from, for example 0 seconds to 180 seconds. Upon expiration of the predetermined period of time, the timer 86 energizes the other leg of relay 134 to close and throw switch 66 to the second position 70 from the first position 68. The timer 86 can use a programmable timer chip made by Motorola bearing number NC14260BCP/FFXA9213. Likewise, the relay 84 can be a 24 VDC relay made by Aromat bearing number JS1E-24/AJ813423B.

Installation of the interface module 30 is simplified according to the present invention. The interface module 30 can be connected at the location of the heating and cooling systems and use the existing wires from the thermostat 12 supplying the cooling and fan signals as these terminate at this separate location. The relay center 16 is often present in known heating and cooling systems 14 and 20. In the present invention, the relay center 16 includes contacts for power 90, cooling 92, heating 94, energization of a fan 96 and a common ground 98. The power lead 24, heating lead 28, and fan lead 29 of the thermostat are connected to the relay center 16 at contacts 90, 94 and 96, respectively. The relay center 16 is located separate from the thermostat 12 with the heating and cooling systems 14 and 20. In addition, the relay center 16 can be present as a bus bar or terminal strip of the heating or cooling systems 14 and 20. While the interface module 30 is described having various input and output connections between the relay center 16 and the interface module 30 so as to have uniformity between FIGS. 1-4, the present invention is not specifically limited to such because direct connections can be made to the interface module 30 such as to the humidifier 22 and the cooling system 20.

The interface module 30 is connected to the existing wires of the thermostat 12. At the separate location of the heating and cooling systems 14 and 20, the wire supplying the cooling signal is split having one end connected to contact 56 and the other end connected to contact 60. Contact 58 is connected directly to the humidifier 22. The existing wire containing the fan signal is connected the contact 96 of the relay center 16 and then is supplied to contact 62 of the interface module 30. The circuits between the relay center 16 and each of the interface module 30, cooling system 20 and humidifier 22 are completed by having common or ground wire 98 connected to contact 64 of the interface module 30, to contact 102 of the cooling system 20, and to contact 104 of the humidifier 22.

Referring to FIGS. 1 and 2, the humidifier 22 can be energized when switch 66 is in the first position 68. Any humidity signal supplied from output 44 to contact 60 is also supplied from contact 58 connected to contact 100, thereby energizing the humidifier 22. Common wire 98 of the relay center 16 is connected to contact 104 of the humidifier 22 to complete the circuit.

Referring to FIGS. 1 and 3, the cooling system 20 can be energized when switch 66 is in the second position 70. Any cooling signal supplied from output 44 to contact 60 is also supplied from contact 56 to contact 106 to energize the cooling system 20. Likewise, the cooling signal can be supplied to contact 92 of the relay center 16 and then supplied to contact 106 of the cooling system 20. Common wire 98 of the relay center 16 is connected to contact 102 of the cooling system 20 to complete the circuit.

Referring to FIG. 2, the operation of the humidistat 10 having the switch 34 in the heating position 36 is described. When the thermostat 12 calls for heat, a heat signal is generated at the heating lead 28 to energize the gas valve 18 and the heating system 14. The same heat increase signal is supplied to input 40 of the humidistat 10. With the switch 34 in the heating position 36 and the humidity sensor 32 closed or otherwise calling for an increase in humidity, the humidity signal is supplied to contact 60 of the interface module 30 from the output 44. At the interface module 30, switch 66 is in the first position 68 wherein pole 72 and contact 74 are closed to provide the humidity increase signal as output from contact 58 of the terminal strip 54. The output from contact 58 is supplied to the humidifier 22 so as to energize the same and to provide moisture to the enclosed volume.

Referring to FIGS. 1 and 3, the operation of the humidistat 10 having the switch 34 in the cooling position 38 is described. The cooling lead 26 of the thermostat 12 is connected to humidistat 10 at input 42. The cooling signal generated is supplied to contact 60 of the interface module 30 from output 44 of the humidistat 10. Upon a call for a decrease in temperature, the thermostat 12 generates the cooling signal from cooling lead 26 as well as the fan signal from fan lead 29. The fan signal is supplied to contact 96 of the relay center 16 which is connected and supplied to contact 62 of the interface module 30. The fan signal applied at contact 62 energizes the relay 78 to throw and close switch 66 from the first position 68 to the second position 70 to energize the cooling system 20, as shown in FIG. 3. In the absence of the call for cooling, no fan signal is supplied to contact 62, the relay 78 is de-energized and the switch 66 returns and closes to the first position 68.

Alternatively, as illustrated in FIG. 4, the fan signal from contact 96 is supplied to contact 62 for energizing the time delay circuit 80. Upon expiration of the predetermined time interval, the relay 84 is energized to close switch 66 to the second position 70. The predetermined period of time is adjustable and can be set at a thirty second interval so that upon expiration of 30 seconds, the time delay circuit 80 energizes relay 84. In the second position 70, the cooling signal is provided as output from contact 56 of the terminal strip 54 to the cooling system 20 to thereby energize and provide cooling to the enclosed volume. The advantage of having the time delay circuit 80 and relay 78 is to allow a short, predetermined period of time to expire so that unnecessary fiddling and fidgeting of a person with the thermostat 12 does not blow or destroy an existing compressor of the cooling system 20.

Many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A humidistat for sensing the humidity of the air in an enclosed volume and sending a humidity increase signal to a humidifier when the humidity falls below a preselected value, said humidistat adapted for use with a thermostat having a plurality of output leads for a heating signal, a fan signal and a cooling signal, said humidistat comprising:

first input means for receiving the heating signal from the thermostat;

second input means for receiving the cooling signal from the thermostat;

first switch means connected to said first and second input means having a heating position and a cooling position for switching between said first and second inputs;

output means connected to said first switch means for providing output signals from said humidistat;

sensor means for sensing the humidity of the air in the enclosed volume, said sensor means connected between said first input and said heating position of said first switch means, wherein said first switch means supplies a humidity increase signal to said output means of said humidistat when said first switch is in said heating position; and module means connectable to said output means for selectively energizing either a humidifier when said first switch means is in said heating position or a cooling system when said first switch means is in said cooling position.

2. A humidistat as in claim 1 wherein said module means further includes second switch means for switching between said humidifier and said cooling system.

3. A humidistat as in claim 2 wherein said module means further includes a relay for switching said second switch means between a first position to energize said humidifier and a second position to energize said cooling system, said relay being energized when the fan signal is applied to said module means.

4. A humidistat as in claim 3 wherein said module means further includes timing means to delay switching said second switch means to said second position for a predetermined period of time after receiving the fan signal, said timing means having said relay and a timer, wherein upon expiration of said predetermined period of time said timer energizes said relay to close said switch means to said second position to energize said cooling system.

5. A control system for a humidifier, said control system adapted to sense and send a humidity increase signal to the humidifier when the humidity of air in an enclosed volume falls below a preselected value, said control system adapted for use with a thermostat having a plurality of leads including an input lead for receiving power, and output leads for sending a heating signal, a fan signal and a cooling signal to control the operation of a heating system and a cooling system, said control system comprising:

a humidistat having inputs for receiving the heating and cooling signals, sensor means for sensing and generating a humidity increase signal to increase the humidity of the air in the enclosed volume, and summer/winter switch means for switching between a heating position and a cooling position, said sensor means being located between said input for receiving said heating signal and said heating position of said summer/winter switch means, said summer/winter switch means generating an output signal to either the humidifier or the cooling system; and an interface module connectable to said humidistat for separately energizing the humidifier or the cooling system, said interface module adapted to energize the humidifier when said humidity increase signal is received and to energize the cooling system when the fan signal is received and said cooling signal is generated from said summer/winter switch means.

6. A control system as in claim 5 wherein said interface module includes a second switch means for switching between the humidifier and the cooling system.

7. A control system as in claim 6 wherein said interface module includes a relay for switching said second switch means between a first position to energize the humidifier and a second position to energize the cooling system, said relay being energized when the fan signal is applied to said interface module to switch said second switch means to said second position from said first position.

8. A control system as in claim 7 wherein said interface module further includes timing means to delay switching said second switch means for a predetermined period of time, said timing means having said relay and a timer, said relay for switching said second switch means between a first position to energize the humidifier and a second position to energize the cooling system, said timer being energized when the fan signal is applied to said interface module, and upon expiration of said predetermined period of time said timer energizes said relay to close said second switch means to said second position thereby energizing the cooling system.

9. An interface module especially adapted to be connected to a humidistat, a thermostat, a humidifier and a cooling system, said interface module comprising:

a first input adapted to be connected to the output of the humidistat;

a second input adapted to be connected to the thermostat;

a first output adapted to be connected to the humidifier;

a second output adapted to be connected to the cooling system; and a switch means connected to said first input for switching between said first and second outputs.

10. An interface module as in claim 9 further including a relay for switching said switch means between said first output to energize the humidifier and said second output to energize the cooling system, said relay being energized when a fan signal is applied from the thermostat to said second input.

11. An interface module as in claim 10 further including timing means to delay switching said switch means for a predetermined period of time, said timing means having said relay and a timer, said timer being energized when a fan signal is applied from the thermostat to said second input, whereby upon expiration of said predetermined period of time of said timer said relay is energized to close said switch means to said second output so as to energize the cooling system.

* * * * *